United States Patent [19]

Smith et al.

[11] 4,274,946

[45] Jun. 23, 1981

[54] AGGLOMERATION TYPE COAL RECOVERY PROCESSES

[75] Inventors: Clay D. Smith; Douglas V. Keller, Jr., both of Lafayette, N.Y.

[73] Assignee: Otisca Industries, Ltd., Syracuse, N.Y.

[21] Appl. No.: 41,063

[22] Filed: May 21, 1979

Related U.S. Application Data

[60] Continuation-in-part of Ser. No. 814,040, Jul. 8, 1977, which is a division of Ser. No. 662,888, Mar. 1, 1976, Pat. No. 4,055,480, which is a continuation-in-part of Ser. No. 460,558, Apr. 12, 1974, Pat. No. 3,941,679.

[51] Int. Cl.³ .............................. B03B 1/04; B03B 7/00
[52] U.S. Cl. ........................................ 209/5; 209/10; 208/180
[58] Field of Search ................ 209/5, 10, 172, 9, 49; 210/21; 208/180

[56] References Cited

U.S. PATENT DOCUMENTS

| 2,744,626 | 5/1956 | Reerink | 209/49 |
|---|---|---|---|
| 3,045,818 | 7/1962 | Muschenborn | 209/5 X |
| 3,259,237 | 7/1966 | Schoeh | 209/9 |
| 3,268,071 | 8/1966 | Puddington | 209/5 |
| 3,856,668 | 12/1974 | Shubert | 209/5 X |
| 3,941,679 | 3/1976 | Smith | 208/11 LE |
| 4,055,480 | 10/1977 | Smith | 210/21 X |
| 4,057,486 | 11/1977 | Meadus | 210/21 X |
| 4,107,036 | 8/1978 | Giesen | 210/21 |

FOREIGN PATENT DOCUMENTS 239506  9/1926  United Kingdom ............ 208/180

*Primary Examiner*—Robert Halper
*Attorney, Agent, or Firm*—LeBlanc, Nolan, Shur & Nies

[57] ABSTRACT

Coal recovery processes of the agglomeration type in which solvent extraction with a fluorocarbon solvent is used to recover the agglomeration promoting additive.

12 Claims, 1 Drawing Figure

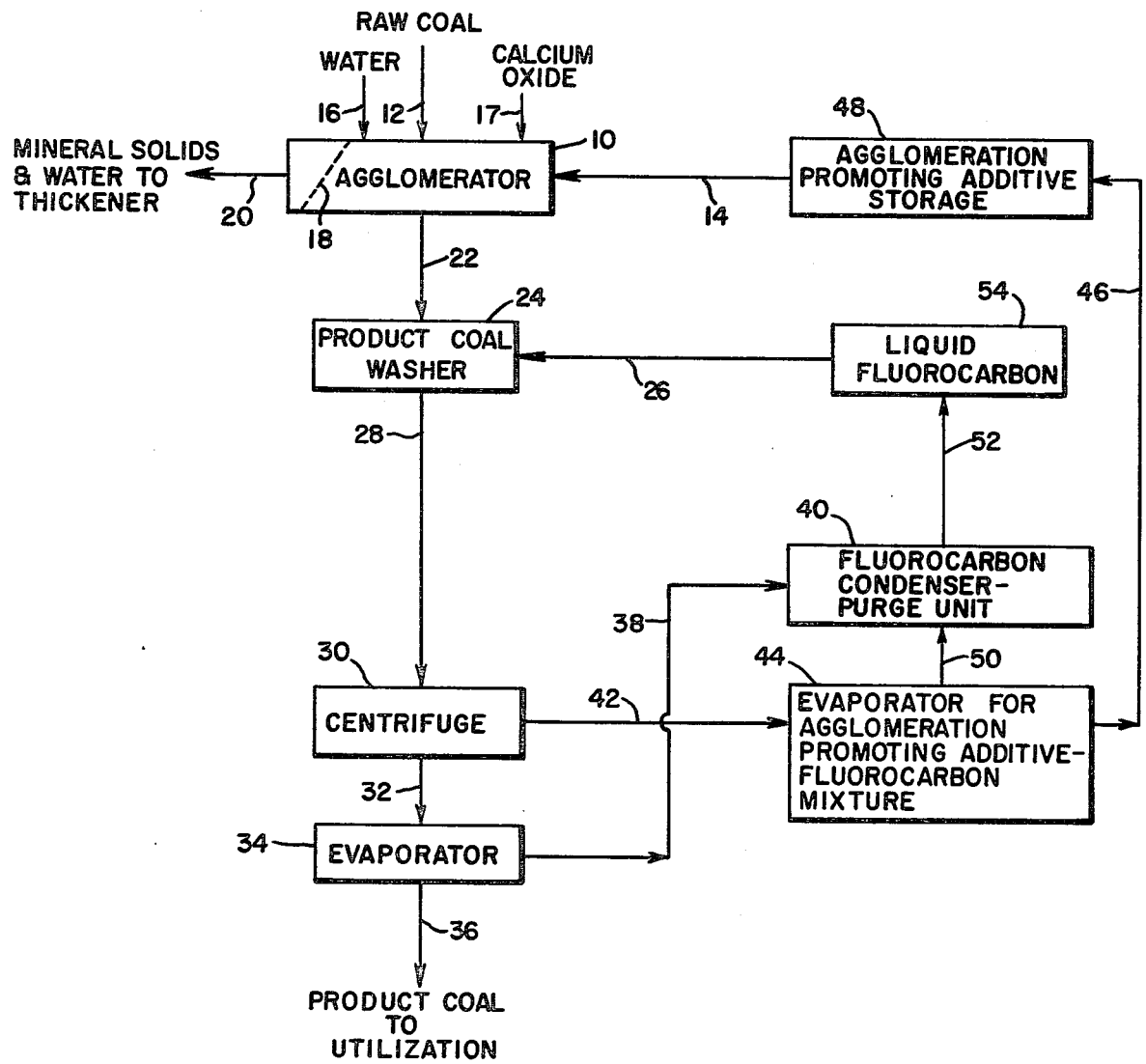

AGGLOMERATION TYPE COAL RECOVERY PROCESSES

This application is a continuation-in-part of application Ser. No. 814,040 filed July 8, 1977. Application Ser. No. 814,040 is a division of application Ser. No. 662,888 filed Mar. 1, 1976 (now U.S. Pat. No. 4,055,480). Application Ser. No. 662,888 is a continuation-in-part of application Ser. No. 460,558 filed Apr. 12, 1974 (now U.S. Pat. No. 3,941,679).

This invention relates to processes for recovering coal in a commercially valuable form. It relates, more specifically, to novel, improved processes of that character in which an agglomeration promoting additive is employed in conjunction with mechanical action to effect the separation of coal particles from mineral matter associated therewith in a slurry and the subsequent coalescence of those particles into flocs or agglomerates which can be recovered from the slurry.

Certain terms used herein are defined as follows:

Raw coal—a composite of coal and mineral matter, a term used herein for the sake of convenience to include impurities other than organic material associated with coal. In general, raw coal will constitute the feedstock for a process designed to remove mineral matter therefrom. The raw coal may be as mined with or without having been subjected to preliminary preparation; or it may be the black water from a hydrobeneficiation plant or the culm from a sludge pond, etc.

Product coal—the carbonaceous coal phase generated in and recovered from a specified cleaning process.

Processes of the character described above, using liquid hydrocarbons as an agglomeration promoting additive, have been available for at least sixty years. Such processes are disclosed in Convertol Process, Brisse et al, *MINING ENGINEERING*, February 1958, pp. 258-261; *AGGLOMERATION 77*, Vol. 2, K. V. S. Sastry, Ed., American Institute of Mining, Metallurgical & Petroleum Engineers, Inc., New York, New York, 1977, chapters 54-56, pp. 910-951; and in U.S. Pat. Nos. 2,744,626 issued May 8, 1956, to Reerink et al; 2,769,537 issued Nov. 6, 1956, to Reerink et al; 2,769,538 issued Nov. 6, 1956, to Reerink et al; 2,781,904 issued Feb. 19, 1957, to Reerink et al; 2,842,319 issued July 8, 1958, to Reerink et al; 3,045,818 issued July 24, 1962, to Muschenborn et al; 3,268,071 issued Aug. 23, 1966, to Puddington et al; 3,637,464 issued Jan. 25, 1972, to Walsh; and 4,033,729 issued July 5, 1977, to Capes et al.

One disadvantage of this prior art process is that the recovery of even a part of the agglomeration promoting additive requires that the product coal agglomerates be heated at a temperature of 250°-350° C. (482°-662° F.). This is economically unattractive. Furthermore, temperatures of the magnitude in question can cause unwanted changes in the composition of the product coal.

Because of the cost of, and problems involved in, recovering agglomeration promoting additives of the conventional type, they have heretofore apparently, for the most part, simply been left on the product coal and lost to the process. At the current elevated prices of the hydrocarbons employed as agglomerating agents, this can make the above-described coal cleaning process economically unattractive.

We have now discovered that, unexpectedly, the agglomeration promoting additive can be recovered from the product coal generated by the process in question at a low enough cost and with a degree of efficiency which makes the process commercially attractive. More particularly, we have found that this novel, and important, objective can be attained by washing the product coal agglomerates with certain halogenated derivatives of methane and ethane which prove to have a high solvent power for the conventional additives. The solvent is then separated from the additive, and both compositions are recycled.

Those solvents which we consider suitable for use in the novel process just described because of their high solvent power, low latent heat of vaporization, low viscosity and surface tension and their chemical inertness toward coal and materials employed in the process equipment are certain fluorinated derivatives of methane and ethane; i.e., compositions of the class generally designated by the generic form "fluorocarbons". Useful fluorocarbons include:

1-Chloro-2,2,2-trifluoroethane
1,1-Dichloro-2,2,2-trifluoroethane
Dichlorofluoromethane
1-Chloro-2-fluoroethane
1,1,2-Trichloro-1,2,2-trifluoroethane
1,1-Dichloro-1,2,2,2-tetrafluoroethane
Trichlorofluoromethane Mixtures of the foregoing compounds can also be employed.

Of the listed compounds, all but the last three are at the present time probably too expensive to be practical from an economic viewpoint. And, of the latter, 1,1,2-trichloro-1,2,2-trifluoroethane and trichlorofluoromethane are preferred because of their optimum physical properties, lack of chemical activity, and relatively low cost.

The boiling points of the fluorocarbons we employ are relatively low. Because of this and their low latent heats of vaporization, they can be separated from the agglomeration promoting additive which they strip from the product coal agglomerates at a modest cost. Recovery rates approaching 100 percent are easily attained.

Also, the fluorocarbons we employ in the novel process described above do not form azeotropes with moisture associated with the product coal to any commercially significant extent. This is important because azeotropes can be resolved into their components only at relatively high cost.

Yet another advantage of our novel process is that the separation of the fluorocarbon solvent from the agglomeration promoting additive can be carried out at ambient temperature and pressure or at temperatures and pressures approaching ambient.

Still another important advantage of our invention, alluded to above, is that the fluorocarbons employed to recover the agglomeration promoting additives do not react chemically with coal under the process conditions we employ. This is important because contaminated coals are undesirable. In the case of steaming coals chemical contaminants can cause boiler corrosion. Contaminated coking coals can alter the chemistry of the reactions in which they are employed in unwanted directions.

Chemical contamination may also make it necessary to purify the fluorocarbon and/or the agglomeration promoting additive before they are recycled to the process. This, potentially, makes the entire process economically unattractive.

Furthermore, because the fluorocarbons we employ are chemically inert under process conditions, our novel process can be carried out without generating the pollutants attributable to many coal cleaning processes.

From the foregoing, it will be apparent to the reader that the primary object of the present invention resides in the provision of novel, improved methods for separating coal from mineral matter associated therewith.

Another important but more specific object of the invention resides in the provision of a process of the character just described in which an additive is introduced into an aqueous slurry of the raw coal to promote the separation of the coal particles from the mineral matter associated therewith and the coalescence of said coal into agglomerates and in which provision is made for subsequently recovering the agglomeration promoting additive from the product coal agglomerates.

Other important but still more specific objects of our invention reside in the provision of processes in accord with the preceding object in which:

the agglomeration promoting additive can be recovered from the product coal agglomerates with only a modest, commercially viable expenditure of energy;

the agglomeration promoting additive can be recovered from the product coal agglomerates without generating ecologically undesirable wastes;

the agglomeration promoting additive can be recovered from the product coal agglomerates under conditions which are, or approach, ambient, thereby eliminating the safety and other problems appurtenant to the use of high temperatures and/or non-atmospheric pressures.

Still another important object of the present invention resides in the provision of coal cleaning processes which employ a soluble agglomeration promoting additive and in which the additive is recovered from the product coal agglomerates by washing the agglomerates with a fluorocarbon in which the additive is soluble, mechanically separating the fluorocarbon and additive from the agglomerates, separating the fluorocarbon from the agglomeration promoting additive, and recycling both the fluorocarbon and the additive.

Related, but more specific, objects of our invention reside in the provision of processes in accord with the preceding object:

which employ a fluorocarbon that can be separated from the agglomeration promoting additive by evaporation and then purged of non-condensible gases, condensed, and recycled with only modest expenditures of energy;

which employ a fluorocarbon that has high solvent power and low viscosity, surface tension, and latent heat of vaporization and which is chemically inert with respect to coal under the process comditions;

which employ fluorocarbons that are non-flammable, odor free, non-corrosive, and non-toxic.

Other important objects, advantages, and features of the present invention will be apparent from the foregoing and the appended claims and as the ensuing detailed description and discussion proceeds in conjunction with the appended drawing in which the single FIGURE is a flow diagram of one process for beneficiating coal in accord with the principles of the present invention.

Referring now to the drawing, the separation of coal from the mineral matter associated therewith, the subsequent agglomeration of the coal particles, and the ejection of mineral matter and water from the agglomerates is carried out in an agglomerator 10 which may be, for example, a homogenizer as described in U.S. Pat. No. 2,744,626 issued May 8, 1956, to Reerink et al; a tumbler as described in U.S. Pat. No. 3,471,267 issued Oct. 7, 1969, to Capes et al; or a ball, beater, buhr, cage, Chilean, colloid, disc, distintegrating, hammer, pebble, pendulum, pin, Raymond, rod, or comparable mill.

The separation may be carried out at ambient temperature and pressure.

Agglomerator 10 provides mechanical forces which jam the coal particles in the raw coal into agglomerates of the wanted character and which eject the mineral matter and water from the agglomerates. In addition, it generates forces which knead or work the agglomerates to expel additional mineral matter and water therefrom.

Also, if a mill type agglomerator is employed, the agglomerator reduces the size of the material fed to it, perhaps liberating additional product coal from the mineral matter to which it is bound, and exposing fresh surfaces on the coal particles. Exposure of fresh surfaces to the agglomerating agent can be important because the agglomeration of the product coal particles involves surface active phenomena which, at least generally, operate most efficiently only on freshly exposed coal particle surfaces.

Raw coal and the selected agglomeration promoting additive are introduced into agglomerator 10 through transfer devices indicated generally by reference characters 12 and 14. Such water as may be necessary to form a slurry with appropriate characteristics is introduced into mill 10 through conduit 16.

The amount of additive we employ is that necessary for an efficient agglomeration of the particles of product coal to be effected. As discussed in the references cited above, this can range from 60 to over 200 pounds of additive per ton of coal.

As indicated above, the additive employed in our novel process is a hydrocarbon which is soluble in the fluorocarbon used to recover it. The additive, which must be one with respect to which the coal particles are hydrophobic, will typically be, or include: a petroleum distillate or solvent; a nitrobenzene; a kerosene; a lubricating, fuel, or residual oil; or a chlorinated biphenyl.

As discussed in copending application Ser. No. 958,749, filed Nov. 8, 1978 (now abandoned), it is also desirable, in many cases, to add calcium oxide in either hydrated or anhydrous form to the slurry during the agglomeration process. The calcium oxide, if employed, is introduced into agglomerator 10 through transfer device 17. From 0.5 to 3 percent of calcium oxide (calculated as CaO) based on the weight of the raw coal is employed. It is preferred that the calcium oxide be dosed or metered to the agglomerator over the period of coal particle separation and agglomeration.

The aqueous carrier and mineral matter are discharged from agglomerator 10 through a screen 18 on which the agglomerates of product coal are retained. This aqueous phase is transferred through conduit 20 to a conventional thickener (not shown). Suitable thickeners are described in Taggart, *HANDBOOK OF MINERAL DRESSING*, John Wiley & Sons, Inc., New York, New York, 1927, pp. 15-04–15-26, hereby incorporated by reference. The mineral matter consolidated in the thickener may be transferred to a refuse heap or landfill, for example; and the water can be recycled.

Up to 200 pounds per ton or more of agglomeration promoting additive may remain on the product coal agglomerates retained on screen 18. This additive is recovered by transferring the agglomerates through conduit 22 to a washer 24 where the additive is washed or leached from the agglomerates with a fluorocarbon solvent of the character described above and introduced into the washer through line 26.

The design of the washer is not critical. It may, as one example, be a countercurrent extractor of the character described in U.S. Pat. No. 3,941,679 issued Mar. 2, 1976, to Smith et al.

The process conditions described in that patent are directly applicable in stripping or washing the agglomeration promoting additive from the product coal agglomerates in washer 24.

One effluent from the washer consists of product coal agglomerates wetted with the solvent and dispersed in the solvent-additive phase generated in the washer.

This effluent is transferred through line 28 to a centrifuge 30 mechanically to separate the agglomerates from the solvent and additive. Product coal agglomerates with their accompanying burdens of fluorocarbon solvent not recovered by centrifuging and in at least the majority of cases, at least some surface water, are transferred from the centrifuge through line 32 to an evaporator 34 where at least the fluorocarbon is stripped from the agglomerates. Moisture associated therewith may also be stripped from the coal in evaporator 34.

However, it is not in every case necessary that all, or even any, of this moisture be removed; and it is an important feature of our invention that an essentially quantitative (99% plus) recovery of the fluorocarbon can be made without removing the water. It is also important that, if a reduction in product coal moisture content does prove necessary, evaporation of the fluorocarbon solvent can be effected at a fast enough rate to substantially reduce the vapor pressure over and, as a consequence, the cost of recovering the moisture from, the coal.

Suitable evaporators are described in copending application Ser. No. 561,168 (now U.S. Pat. No. 4,173,530 issued Nov. 6, 1979) filed Mar. 24, 1975.

Dried agglomerates discharged from evaporator 34 are ready for utilization as indicated by arrow 36.

Vapor generated in evaporator 34 flows through line 38 to a condensor-purge unit 40.

The solvent-additive mixture discharged from centrifuge 30 is pumped through line 42 to an evaporator 44 where the solvent is stripped from the higher boiling point agglomeration promoting additive. The additive is transferred through line 46 to an additive storage facility or tank 48 from which it can be recirculated to agglomerator 10 through transfer device 14.

Vaporized solvent generated in evaporator 44 is transferred through line 50 to condensor-purge unit 40 where it is combined with the vapor flowing to that unit through line 38. Condensed, degassed solvent is pumped from unit 40 through line 52 to storage facility tank 54.

Numerous embodiments of our invention have been described above, and that invention may be embodied in still other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent of the United States is:

1. A process for recovering coal from a particulate composite in which said coal is associated with mineral matter, said process comprising the steps of: treating said composite in an aqueous carrier with a non-aqueous, organic agglomeration promoting additive with respect to which the coal is hydrophobic to effect a coalescence of the coal particles into product coal agglomerates and the ejection of mineral matter into dispersion in said aqueous carrier; recovering said product coal agglomerates from said aqueous carrier; and washing said product coal agglomerates with a fluorocarbon in which said additive is soluble to thereby effect a recovery of said agglomeration promoting additive from said product coal agglomerates.

2. A process as defined in claim 1 together with the steps of mechanically separating said product coal agglomerates from said agglomeration promoting additive and said fluorocarbon and thereafter resolving the mixture of agglomeration promoting additive and fluorocarbon into its constituents and recycling said constituents.

3. A process as defined in claim 1 wherein the fluorocarbon is selected from the group consisting of:
   dichlorofluoromethane
   trichlorofluoromethane
   1,1,2,2-tetrachloro-1,2-difluoroethane
   1,1,2-trichloro-1,2,2-trifluoroethane
   1,1-dichloro-1,2,2,2-tetrafluoroethane
   1-chloro-2,2,2-trifluoroethane
   1,1-dichloro-2,2,2-trifluoroethane
   1-chloro-2-fluoroethane
and mixtures of the foregoing.

4. A process as defined in claim 1 in which the agglomeration promoting additive comprises a petroleum distillate or solvent; a nitrobenzene; a kerosene; a lubricating, fuel, or residual oil; or a chlorinated biphenyl.

5. A process as defined in claim 1 which includes the steps of stripping the fluorocarbon from the product coal agglomerates and then recovering and recycling said fluorocarbon.

6. A method as defined in claim 1 which is carried out at ambient temperature and pressure.

7. A process for dissociating coal from a composite in which mineral matter is associated therewith and recovering said coal in agglomerated form, said process comprising the steps of: forming a slurry of said composite in an aqueous carrier; providing a non-aqueous, organic agglomeration promoting additive with respect to which said coal particles are hydrophobic in said slurry in an amount sufficient that agglomeration of the coal can be effected; comminuting the particles of composite while in said slurry to separate the mineral matter from the coal and to generate coal particles having freshly exposed surfaces in a controlled environment; mechanically effecting the coalescence of the coal particles into product coal agglomerates and the ejection of mineral matter and water from the agglomerates into dispersion in said aqueous carrier; recovering said product coal agglomerates from said slurry; and washing said product coal agglomerates with a fluorocarbon solvent in which the agglomeration promoting additive is soluble to thereby recover said agglomeration promoting additive from said product coal agglomerates.

8. A process as defined in claim 7 together with the steps of mechanically separating said product coal agglomerates from said agglomeration promoting additive and said fluorocarbon and thereafter resolving the mixture of agglomeration promoting additive and fluorocarbon into its constituents and recycling said constituents.

9. A process as defined in claim 7 wherein the fluorocarbon is selected from the group consisting of:
dichlorofluoromethane
trichlorofluoromethane
1,1,2,2-tetrachloro-1,2-difluoroethane
1,1,2-trichloro-1,2,2-trifluoroethane
1,1-dichloro-1,2,2,2-tetrafluoroethane
1-chloro-2,2,2-trifluoroethane
1,1-dichloro-2,2,2-trifluoroethane
1-chloro-2-fluoroethane and mixtures of the foregoing.

10. A process as defined in claim 7 in which the agglomeration promoting additive comprises a petroleum distillate or solvent; a nitrobenzene; a kerosene; a lubricating, fuel, or residual oil; or a chlorinated biphenyl.

11. A process as defined in claim 7 which includes the steps of stripping the fluorocarbon from the product coal agglomerates and then recovering and recycling said fluorocarbon.

12. A method as defined in claim 7 which is carried out at ambient temperature and pressure.

* * * * *